United States Patent [19]
Oketani et al.

[11] Patent Number: 5,957,632
[45] Date of Patent: Sep. 28, 1999

[54] TOOL POSITION CORRECTING DEVICE

[75] Inventors: Tetsuya Oketani, Gifu; Masahiro Yoshida, Shikatsu-Cho; Hideo Uemura, Nagoya, all of Japan

[73] Assignee: Howa Machinery, Ltd., Nagoya, Japan

[21] Appl. No.: 08/617,179

[22] Filed: Mar. 18, 1996

[30] Foreign Application Priority Data

Mar. 22, 1995 [JP] Japan .................................. 7-090399

[51] Int. Cl.⁶ .................................................. B23B 47/00
[52] U.S. Cl. .......................... 408/150; 408/161; 408/168
[58] Field of Search .................................. 408/147, 150, 408/151, 158, 161, 168; 279/103

[56] References Cited

U.S. PATENT DOCUMENTS

| | | | |
|---|---|---|---|
| 2,558,815 | 7/1951 | Briney, Jr. | 408/151 |
| 2,643,556 | 6/1953 | Briney, Jr. | 408/150 |
| 3,254,548 | 6/1966 | Gersch | 77/58 |
| 3,640,633 | 2/1972 | Gersch | 408/12 |
| 3,731,562 | 5/1973 | Heuser | 82/12 |
| 3,884,590 | 5/1975 | Skrentner | 408/8 |
| 5,322,304 | 6/1994 | Rivin | 279/103 |

FOREIGN PATENT DOCUMENTS

| | | |
|---|---|---|
| 2054165 | 5/1972 | Germany . |
| 3014334 | 10/1981 | Germany . |
| 4021090 | 1/1991 | Germany . |

*Primary Examiner*—Steven C. Bishop
*Attorney, Agent, or Firm*—Ladas & Parry

[57] ABSTRACT

A tool position correcting device comprises a draw bar supported for axial movement in a central bore of a spindle of a machine tool, a tool holder supported for turning about an eccentric axis displaced from the axis of rotation of the spindle on the nose of the spindle, and a motion converting mechanism operatively interlocking the draw bar and the tool holder to convert the axial motion of the draw bar into the rotational motion of the eccentric rotary member. The spindle is provided with a tapered hole tapering backward in its front end, the tool holder has a tapered portion tapering backward and conforming with the tapered hole of the spindle and is held on the spindle with its tapered portion supported on balls in the tapered hole, and a spring is disposed between the spindle and the tool holder to bias the tool holder backward relative to the spindle so that the tapered portion is pressed through the balls against the tapered surface of the tapered hole so that the tool holder can be turned by a comparatively small torque when correcting the position of the cutting edge of the tool, and the composite fastening effect due to the tapered hole, the tapered portion and the spring provides a large force for holding the eccentric rotary member firmly on the spindle.

4 Claims, 3 Drawing Sheets

TOOL POSITION CORRECTING DEVICE

BACKGROUND OF THE INVENTION

1. Field of the Invention

The present invention relates to a tool position correcting device capable of correcting the position of the cutting edge of a tool on a machine tool.

2. Description of the Related Art

A tool position correcting device disclosed in JP-A No. 3-35906 comprises a draw bar or rod supported for axial movement in the central bore of the spindle of a machine tool, an eccentric tool holder or eccentric rotary member supported on the nose of the spindle for rotation about an eccentric axis displaced from the axis of rotation of the spindle, and a motion converting mechanism, such as a screw mechanism, interlocking the draw bar and the tool holder to convert an axial motion of the draw bar into a rotational motion of the tool holder. The tool holder is turned by axially moving the draw bar to vary the radial distance of the tool held on the tool holder from the axis of rotation of the spindle to correct the position of the cutting edge of the tool.

In this known tool position correcting device, the tool holder is supported on the spindle with its back end fitted in bearings fitted in the holder support hole of the spindle and hence the tool holder can be turned by a comparatively small torque when correcting the position of the cutting edge of the tool. However, the force holding the tool holder on the spindle is not very large and hence the tool position correcting device is unsuitable for holding a tool for heavy machining.

SUMMARY OF THE INVENTION

Accordingly, it is an object of the present invention to provide a tool position correcting device capable of firmly holding a tool for heavy machining on a machine tool.

With the object in view, the present invention provides a tool position correcting device comprising: a draw bar supported for axial movement in a central bore of the spindle of a machine tool; an eccentric tool holder for holding a tool, supported for rotation about an eccentric axis displaced from the axis of rotation of the spindle on the nose of the spindle; and a motion converting mechanism operatively interlocking the draw bar and the eccentric tool holder to convert axial motion of the draw bar into rotational motion of the eccentric tool holder.

The spindle is provided with a tapered hole in its front end, the eccentric tool holder has a tapered portion conforming with the tapered hole of the spindle and is held on the spindle with its tapered portion supported on balls in the tapered hole of the spindle, and a spring is disposed between the spindle and the eccentric tool holder to bias the eccentric tool holder backward relative to the spindle so that the tapered portion of the eccentric tool holder is pressed through the balls against the tapered surface of the tapered hole of the spindle.

The eccentric tool holder can be turned by a comparatively small torque when correcting the position of the cutting edge of the tool, and the composite fastening effect of the combination of the tapered hole of the spindle, the tapered portion of the eccentric tool holder and the spring provides a large force for holding the eccentric tool holder firmly on the spindle.

The above and other objects, features and advantages of the present invention will become more apparent from the following description taken in connection with the accompanying drawings.

DETAILED DESCRIPTION OF THE PREFERRED EMBODIMENT

Figure 1:
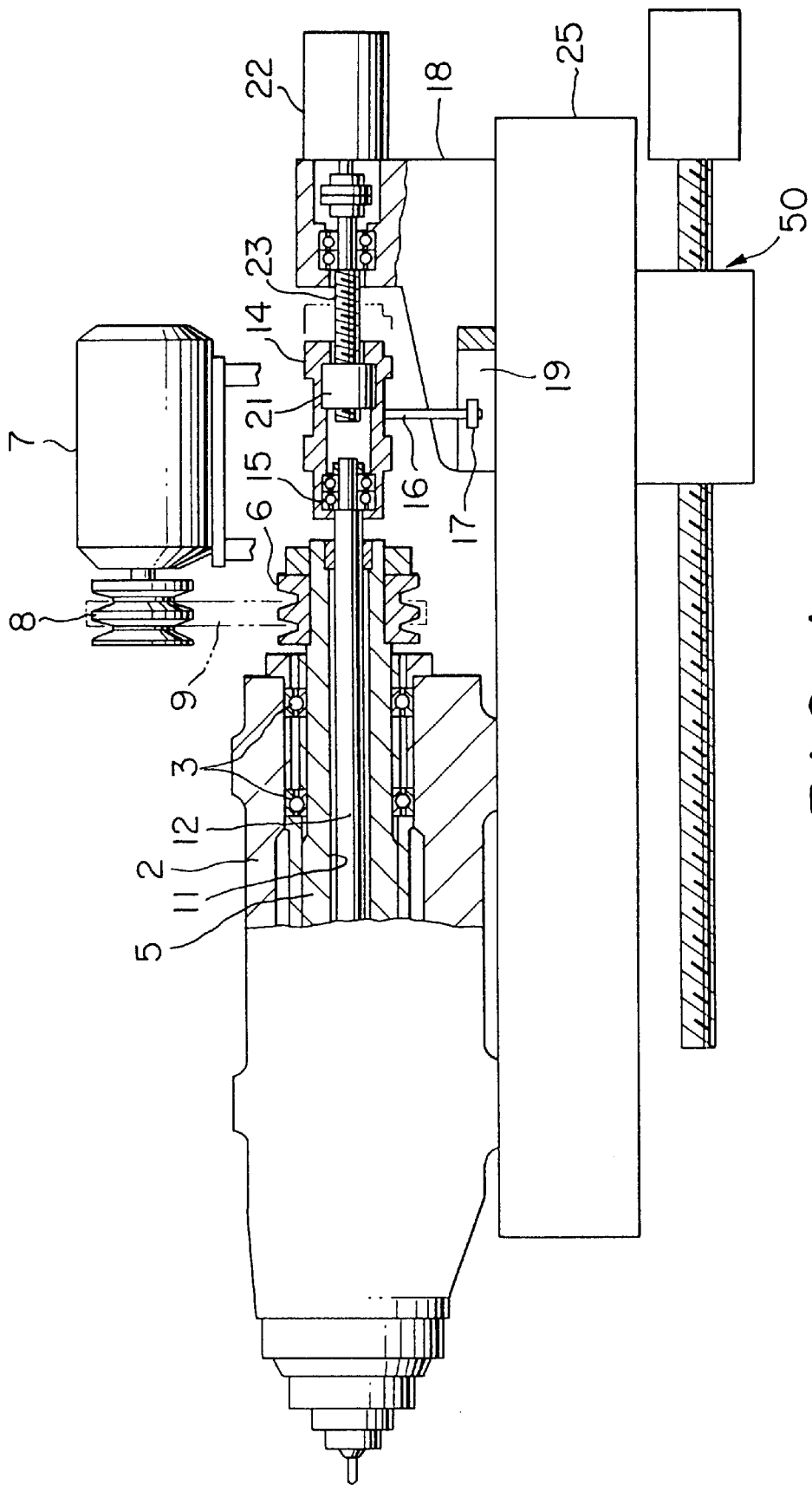
FIG. 1 is a longitudinal sectional view of a tool position correcting device in a preferred embodiment according to the present invention.

Referring to FIG. 1, there is illustrated a tool position correcting device 1 wherein a spindle 5 is supported for rotation in main bearings 3 on a spindle stock 2 of a machine tool, and a driven pulley 6 is mounted on the back end of the spindle 5. Belts 9 are extended between the driven pulley 6 and a drive pulley 8 mounted on the output shaft of a motor 7. The spindle 5 is provided with an axial central bore 11 extending along the axis CL1 (FIG. 2) of rotation of the spindle 5 and having opposite open ends. A draw bar 12 is axially movably inserted in the central bore 11 so that the front end portion thereof lies in an enlarged front section 11a (FIG. 2) of the central bore 11. The draw bar 12 is supported rotatably at its back end in bearings on a moving member 14. A rod 16 has an upper end fixed to the moving member 16, and a lower end rotatably supporting a guide roller 17. The guide roller 17 is in a guide groove 19 formed in a stand 18 to restrain the moving member 14 from turning.

An internally threaded block 21 is fixedly mounted on the moving member 14, and a screw shaft 23 coupled with the output shaft of a motor 22 supported on the stand 18 is screwed in the internally threaded block 21. When the output shaft of the motor 22 rotates in opposite directions, the moving member 14 is advanced and retracted in a range between a position indicated by solid lines and a position indicated by imaginary lines in FIG. 1 to move the draw bar 12 axially in opposite directions relative to the spindle 5 in the central bore 11 of the spindle 5. The spindle stock 2, the stand 18 and the motor 7 are fixedly mounted on a slide 25, which is moved axially in opposite directions by a ball-and-screw mechanism 50.

Figure 2:
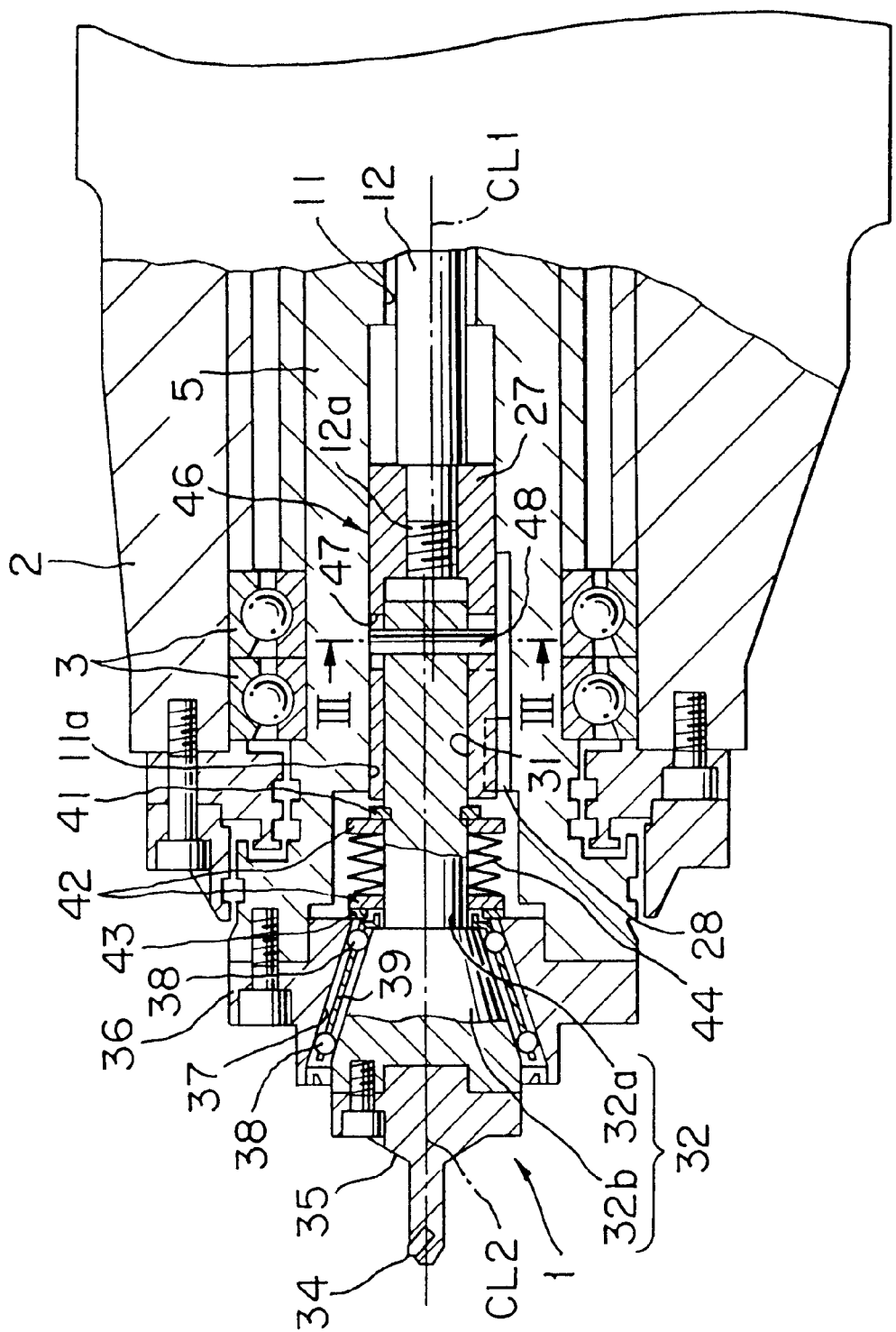
FIG. 2 is an enlarged longitudinal sectional view of a principal portion of the tool position correcting device of FIG. 1.

Referring to FIG. 2, a slide cam member 27 is fitted for axial movement in the enlarged section 11a of the central bore 11, and fitted on and fastened with a screw 12a to the front end portion of the draw bar 12. The slide cam member 27 is restrained from turning relative to the spindle 5 by a machine key 28 inserted between the slide cam member 27 and the spindle 5. The slide cam member 27 is provided with a holder support hole 31 having an eccentric center axis CL2 displaced by a small eccentricity from the axis CL1 of rotation of the spindle 5.

A tool holder 32, i.e., an eccentric rotary member, has a back portion 32a rotatably fitted in the holder support hole 31, and a front portion 32b tapered backward. An arbor 35 is fastened to the front end surface of the tapered front portion 32b with screws, and a tool 34 is attached to the free end of the arbor 35. An adapter 36 is fastened with screws to the front end surface of the spindle 5 with its center axis in alignment with the eccentric center axis CL2 of the holder support hole 31. The adapter 36 is provided with a hole 37 tapered backward and conforming with the tapered front portion 32b of the tool holder 32.

Steel balls 38 are interposed between the tapered front portion 32b and the surface of the tapered hole 37. The steel balls 38 are retained rotatably at equal angular intervals on the front and the back end of a highly rigid retainer 39. A stop ring 41 is fixed to the outer surface of the back portion 32a, and front and back collars 42 are mounted on the back portion 32a between the stop ring 41 and the back end surface of the adapter 36. A spring 44 is extended between the front and the back collar 42 to bias the tool holder 32 backward. A thrust bearing 43 is interposed between the front collar 42 and the back end surface of the adapter 36. The spring 44 is designed so that the resilience thereof is sufficient to hold the tool holder 32 firmly on the spindle 5 during heavy machining.

Figure 3:
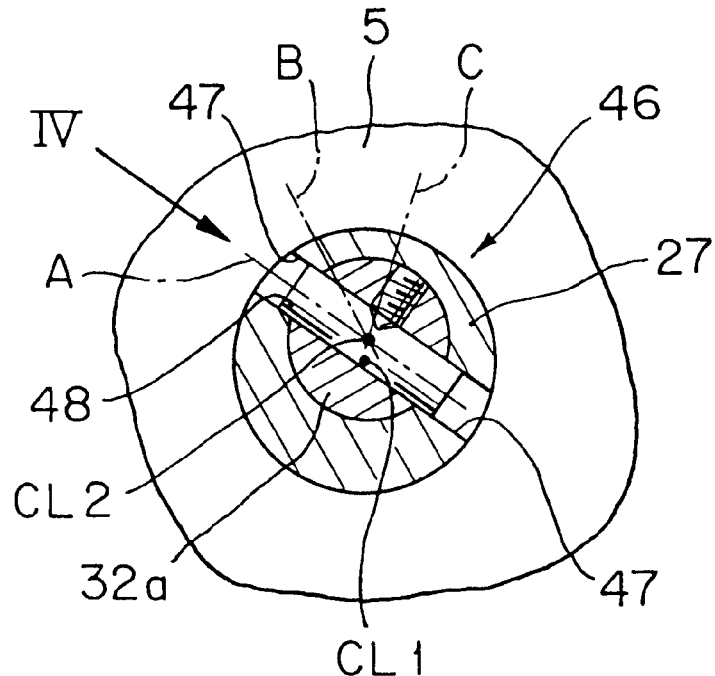
FIG. 3 is an enlarged sectional view taken on line III—III in FIG. 2.
Figure 4:
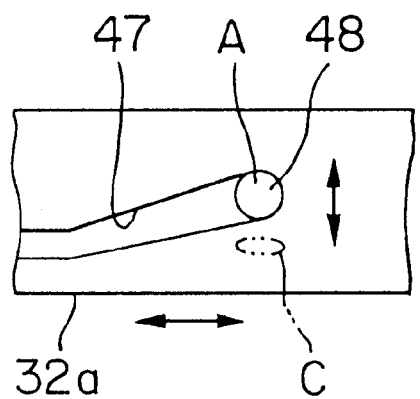
FIG. 4 is a view of a portion of the tool position correcting device of FIG. 1, provided with cam slots taken along the arrow IV in FIG. 3.

A motion converting mechanism 46 for operatively interlocking the tool holder 32 and the spindle 5 will be described below. Referring to FIGS. 3 and 4, cam slots 47 are formed at diametrically opposite positions, respectively, in the slide cam member 27. The opposite ends of a pin 48 fixed to the back end of the back portion 32a of the tool holder 32 are received in the cam slots 47, respectively. The cam slots 47 are designed to turn the pin 48 about the eccentric axis CL2 between a retracting position A and a limit position C when the slide cam member 27 is driven via the moving member 14 by the motor 22 for axial movement between a front position and a back position. The cutting edge of the tool 34 is retracted to the backmost position when the pin 48 is turned to the retracting position A. The pin 48 is located at a datum position B to locate the cutting edge of the tool 34 at a zero point before starting a machining operation.

The operation of the tool position correcting device 1 will be described hereinafter. The arbor 35 holding a desired tool 34 is fastened to the tool holder 32, and the motor 22 is actuated to move the moving member 14 to locate the pin 48 at the datum position B for zeroing. Further, the tool holder 32 is turned to be adjusted to an eccentric position where the cutting edge of the tool 34 is located at a position corresponding to a specified dimension of a work. Then, the machine tool is started to machine the work. Upon completion of the machining operation, the motor 22 is actuated to shift the moving member 14 to the front limit position to cause the pin 48 to be turned to the retracting position A. Consequently, the tool 34 is retracted to separate the cutting edge thereof from the work. Then, the slide 25 is driven for return travel by the ball-and-screw mechanism 50. The machined surface of the work will not be damaged with the tool 34 when the slide is driven for return travel because the tool 34 has been retracted. The dimension of the machined portion of the work is measured every time the machining cycle is completed and, when the measured dimension deviates beyond an allowable range due to the abrasion of the tool 34, a driving signal corresponding to a necessary correction is given to the motor 22 to retract the moving member 14 accordingly to turn the pin 48 toward the limit position C so that the position of the cutting edge of the tool 34 is corrected.

In the tool position correcting device 1 of the present invention, the tapered front portion 32b of the tool holder 32 is held on the steel balls 38 in the tapered hole 37 of the adapter 36. Therefore, the tool holder 32 can be turned by a comparatively small torque when correcting the position of the cutting edge of the tool 34 and hence the motor 22 for axially moving the draw bar 12 may be of a comparatively small output capacity, the tool holder 32 can be held by an increased holding force on the spindle 5 during machining operation, and hence the tool position correcting device 1 is capable of firmly holding a tool during heavy machining. The agency of the spring further enhances the holding force for holding the tool holder 32 on the spindle 5.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. In a tool position correcting device for correcting a position of a cutting edge of a tool on a spindle of a machine tool, the improvement of the tool position correcting device comprising:

a draw bar in a central bore of the spindle for axial movement;

a forwardly diverging tapered hole in a front end of the spindle;

an eccentric tool holder on the front end of the spindle for holding the tool and turning about an eccentric axis displaced from an axis of rotation of the spindle, the eccentric tool holder having a tapered front portion conforming with the tapered hole the eccentric tool holder also having a back portion extending backward from the tapered front portion in the form of a shaft fitted slidably in the spindle the back portion having a stop ring thereon;

balls rotatably interposed between the tapered portion and the tapered hole;

a ball retainer for retaining the interposition of the balls;

motion converting means operatively interlocking the draw bar and the eccentric tool holder for converting the axial movement of the draw bar into the turning of the eccentric tool holder; and a spring between the spindle and the eccentric tool holder for exerting a backward force on the stop ring, whereby to bias the eccentric tool holder backward relative to the spindle so that the tapered portion is pressed through the rotatable balls against the tapered hole.

2. The tool position correcting device according to claim 1, wherein said tapered hole is formed in an adapter fixedly secured to said spindle.

3. The tool position correcting device according to claim 1, wherein said tapered hole is formed in an adapter fixedly secured to a front end of said spindle and said spring is interposed between the stop ring and the adapter.

4. The tool position correcting device according to claim 1, wherein said motion converting means comprises a substantially cylindrical slide cam member slidably fitted in said central bore of the spindle and interlocked with the draw bar, said back portion of the eccentric tool holder being slidably fitted in said slide cam member, a pin fixed to said back portion, and a cam slot formed in said slide cam member and receiving said pin.

* * * * *